3,005,747
INSECT REPELLENTS

Ernst Jacobi and Siegmund Lust, Darmstadt, and Albert van Schoor, Traisa, near Darmstadt, Germany, assignors to E. Merck Aktiengesellschaft, Darmstadt, Germany, a corporation of Germany
No Drawing. Filed Feb. 13, 1958, Ser. No. 714,941
Claims priority, application Germany Sept. 7, 1957
14 Claims. (Cl. 167—22)

This invention relates to insect repellents. In particular it is directed to effectuating insect repellency by means of caprylic acid lower alkyl amides having the general formula

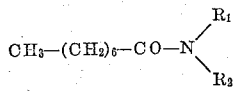

wherein $R_1$ is hydrogen or a lower alkyl radical and $R_2$ is a lower alkyl radical, the total number of carbon atoms of $R_1$ plus $R_2$ when both are alkyl being from 2 to 6 carbon atoms.

Insect repellent compositions embodying the aforesaid repellents can be provided in all forms customarily used to impart insect repellency. For example, one can produce sprays, solutions, emulsions salves or ointments, lacquers, paints, pastes, etc. The concentration of the active ingredients, which can be one or more of the aforesaid repellents, may be generally up to about 95% by weight of the composition which comprises a suitable vehicle or carrier or, if desired, a diluent.

Insecticides are not capable of either preventing insects from alighting or from biting, which may lead to infection, since the action of insecticides occurs only after a certain latent period. Insect repellents serve the purpose of deterring flying insects from alighting and hence from biting, and sucking. Hence repellents serve an important hygienic purpose and continuous attempts are made to improve the activity of repellents.

The first large scale application of repellents was made during the second world war by armies fighting and stationed in the tropics. Among the numerous substances which were tested during this period for their repellent activity, only the following four have really been used: Phthalic acid dimethylester, 2-ethyl-hexane-1,3-diol; 3,4-dihydro-2,2-dimethyl-4-oxo-2-H-pyrane-6-carbonic acid-n-butylester, and the dimethyl ester of the cis-bicyclo-(2,2,1)-5-heptene-2,3-dicarbonic acid.

Today these compounds are obsolete and at the present time the most efficient repellents are succinic acid-di-n-butyl-ester and m-toluic acid di-ethyl-amide.

As appears from the enumeration of the heretofore known highly efficient repellents, they do not have any common principles of constitution. So far there is not known any rule of causes between the chemical constitution and the repellent activity.

It was surprising to find, in the course of the investigation which resulted in the present invention, that caprylic acid-diethyl-amide $CH_3—(CH_2)_6—CO—N(C_2H_5)_2$ shows a very good repellent activity. This result could not be expected in view of the fact that compounds closely related to this substance, as for instance aromatic substituted caprylic acid amide, such as caprylic acid-di-phenylamide or derivatives poorer in carbon content, such as caproic acid diethylamide, do not show repellent activity.

Comparative tests show that caprylic acid-diethylamide has a naturally better repellent activity than m-toluic acid-diethyl-amide and succinic acid-di-n-butylester. The doses that are necessary to deter 80% of all flies is, for m-toluic acid-diethyl-amide, about three times as high as that for caprylic acid-diethyl amide. Caprylic acid-diethyl-amide also shows a better repellent activity in comparison with succinic acid-di-n-butylester since caprylic acid-diethyl-amide is active against biting insects in contrast to succinic acid-di-n-butylester.

Caprylic acid-diethyl-amide can be synthesized by the usual methods of manufacturing acid amides, as for instance, by the reaction of caprylic acid-chloride or caprylic acid ester with diethyl amine (the ethylation of caprylic acid amide or caprylic acid ethyl amide).

CAPRYLIC ACID N-ETHYL AMIDE

To a solution of 90 g. of caprylic acid chloride in 800 cm.³ of petroleum ether (boiling point 100–140° C.) there is added dropwise while stirring a solution of 50 g. of ethyl amine in 200 cm.³ of petroleum ether. The temperature raises up to about 75°. Stirring is continued for 15 minutes at this temperature. Then the mixture is cooled, filtered and washed with a dilute aqueous solution of sodium hydrogen carbonate. It is dried over $K_2CO_3$ and the solvents are distilled off. The residue is distilled in vacuo. The yield is 89.5 g. of caprylic acid N-ethyl amide which boils at 156–158° C. at 12 mm. Hg.

CAPRYLIC ACID DI-ISOPROPYL-AMIDE

To a solution of 45.1 g. caprylic acid chloride in 600 cm.³ of absolute ether there is added dropwise while stirring a solution of 56 g. of di-isopropyl amine in 100 cm.³ of absolute ether. The solution heats spontaneously up to the boil. After having added 300 cm.³ of absolute ether the mixture is boiled under reflux for half an hour. Then it is cooled, filtered, washed with dilute aqueous sodium hydrogen carbonate solution and dried over $K_2CO_3$. The solvents are distilled off and the residue is distilled in vacuo. The caprylic acid di-isopropyl amide boils at 138–140° C. at 12 mm. Hg.

CAPRYLIC ACID N-BUTYL AMIDE

A solution of 50 g. of caprylic acid chloride in 100 cm.³ of absolute ether is stirred into a solution of 50 g. of n-butyl amine in 500 cm.³ of absolute ether. The mixture spontaneously heats up to the boil. After being stirred for half an hour, the mixture is cooled, filtered off and washed with ether. The ethereal layer is dried over $K_2CO_3$ and distilled off. The residue is distilled in vacuo. Boiling point 176–178° C. at 12 mm. Hg. The yield is 52.6 g.

CAPRYLIC ACID N-ETHYL N-METHYL AMIDE 39 g. of caprylic acid chloride in 50 cm.³ of petroleum ether are added dropwise while stirring to 33.5 g. of methyl ethyl amine in 250 cm.³ of petroleum ether. The mixture heats up spontaneously. The reaction product is treated as described in the foregoing example. The yield is 36.4 g., boiling point 134–136° C. at 12 mm. Hg.

CAPRYLIC ACID N-ETHYL N-BUTYL AMIDE

To a solution of 10.1 g. of ethyl butyl amine in 150 cm.³ of ether there are added dropwise while stirring 8.1 g. of caprylic acid chloride in 100 cm.³ of ether. The reaction mixture is treated in an analogous manner to the preparation of caprylic acid N-butyl amide as described above. Boiling point 170–172° at 12 mm. Hg.

Caprylic acid-diethyl-amide has been described by Rice and co-workers in the Journal of American Chemical Society, volume 76, page 3730, 1954. The substance boils at 140° C. at 12 Torr (mm. Hg).

The following biological tests have been carried out to establish the repellent activity of the caprylic acid-diethyl-amide.

I. *Testing of the repellent activity upon house flies (Musca domestica)*

*Method.*—The preparation was applied in different concentrations to filter discs and an insecticide was added. By wetting with water a bait action for the flies present was effected. The flies which flew upon the filter discs and came in contact with the insecticide and hence were killed were counted. From the difference between the number of flies present and the number of flies killed one can determine the number of flies deterred by the repellent action. For purposes of evaluation and comparison the dose of the preparation was ascertained at which a certain percentage of all the flies was deterred from alighting upon the filter. This dose was compared with that of a standard preparation.

*Result.*—Dose repellent 80 (D. rep. 80) equals the dose of the active ingredient at which 80% of the baited flies were repelled. The observation time was 80 minutes in each case.

| Tested Substance | Within the first 80 minutes | Control after 30 hours |
| --- | --- | --- |
| Caprylic acid-diethyl-amide. | 2.0 mg./100 cm.$^2$ filter. | 2.1 mg./100 cm.$^2$ F. |
| m-Toluic acid-diethyl-amide. | 5.75 mg./100 cm.$^2$ filter. | 5.75 mg./100 cm.$^2$ F. |

II. *Testing as to the repellent action upon mosquitoes*

*Method.*—The repellent action upon mosquitoes was tested in a location heavily infested with Aedes and Culex mosquitoes under natural conditions. The hands of four test persons were exposed to the flight and bite of the mosquitoes for one hour. In each case one hand was rubbed in with about 400 mg. of ointment containing a different percentage, and one hand was left untreated as control.

*Result.*—Hands treated with a 10% ointment of caprylic acid-diethyl-amide were not attacked by the mosquitoes while the non-treated hands were exposed to a steady strong attack and bites. Hands treated with a 10% ointment of succinic acid-di-n-butylester were attacked and bitten as much as non-treated hands. To establish the period of action, 50% caprylic acid-diethyl-amide was applied to the skin four hours before the test. After this period there was no decline of repellent activity.

III. *Testing the repelling action on roaches (Blatta orientalis)*

*Method.*—To determine the repellent action on roaches, the tendency of the roaches, who seek darkness, was used for the tests. A certain number of roaches was given the possibility of slipping into two boxes, one of which contained caprylic acid-diethyl-amide. The repellent action can be determined by the distribution of the roaches in both boxes.

*Result.*—The roaches did not go into the box treated with caprylic acid-diethyl-amide.

Caprylic acid-diethyl-amide can be prepared in the usual repellent forms. It can be produced, for example in a solution for spraying, as for instance, by dissolving the compound in an alcohol such as isopropanol. Such solutions are especially suitable for use in spray cans used for aerosols which contain as the propelling agent, low boiling substances such as difluorodichloromethane. By using usual ointment bases, caprylic acid-diethyl-amide can be made into a repellent ointment. The compound can also be mixed with, or dispersed in, paints or applied to wall surfaces, as for example in wall paper. Also, caprylic acid-diethyl-amide is good for addition to floor preparations such as floor wax or similar articles, or as impregnating material for textile fibers, foils or packing materials, as well as for addition to polishing, cleansing or window cleaning preparations. The preparation can be added as well to another suitable emulsifier, such as oxethylated alkyl phenols, oxethylated sorbitan fatty acid esters or alkyl benzene sulfonates.

As has been mentioned it is the general experience that the activity of repellents or pesticides is highly specific to the constitution of the compounds so that in most cases very slight changes of the structure are sufficient to cause the activity of the respective compound either to disappear completely or at least to be strongly reduced.

Accordingly, it was most surprising to find that in addition to caprylic acid diethyl-amide other caprylic acid amides of the general formula

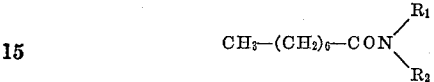

wherein $R_1$ and $R_2$ as above defined show very good repellent activity.

Among the above mentioned other compounds of this class, caprylic acid dimethyl amide also shows a particularly good repellent activity. The dose necessary to deter 80 percent of the used flies is about one-third of the dose which is necessary when m-toluic acid-diethylamide is used. Caprylic acid dimethyl amide shows also advantages in comparison with succinic acid-di-n-butyl ester, as it is also repellent to biting insects. Good results can also be obtained with caprylic acid monoethylamide and caprylic acid-di-isopropyl amide. Caprylic acid dimethyl amide shows also very good repellent activity against cockroaches of the species *Blatta orientalis* in contrast to caprylic acid-di-phenyl amide, caprylic acid-di-n-butyl amide, caprylic acid amide, caprylic acid-mono-phenyl amide, caprylic acid-di-m-toluyl amide and caprylic acid-di-(beta-methyl-mercapto-ethyl)-amide which show no, or only very slight, repellent activity. Caprylic acid-di-α-pyridyl amide has satisfactory repellent activity, but this compound is not practically usable for other reasons.

The repellent activity on flies of these other members of the instant class of insect repellents was tested on *Musca domestica* by following the test arrangement above described.

The following are examples in accordance with this invention.

EXAMPLE 1

100 g. of caprylic acid-diethylamide are mixed with 100 g. of isopropanol. The resulting solution is used as a sprayable repellent.

EXAMPLE 2

A repellent salve is prepared having the following composition:

50 weight percent of caprylic acid-diethylamide.
40 weight percent of a 3 percent aqueous solution of methylcellulose.
10 weight percent of a surface active alkylcarboxylic acid ester of a polyethylene glycol.

EXAMPLE 3

100 g. of caprylic acid-dimethyl-amide are mixed with 100 g. of isopropanol. The solution is used as a sprayable repellent.

EXAMPLE 4

A repellent salve is prepared having the following composition:

50 parts by weight of caprylic acid-mono-ethylamide.
40 parts by weight of a 3% aqueous solution of methyl-cellulose.
10 parts by weight of a surface active alkyl-carboxylic-acid-polyethylene-glycol-ester.

EXAMPLE 5

10.0 parts by weight of N-diethyl-caprylamide, 0.5 part by weight of highly viscous, ester-soluble alcohol-moist collodium wool and 0.5 part by weight of scent essence are mixed and diluted with 89.0 parts by weight of methylene-chloride. This solution is filled with 50 parts by weight of difluorodichloro-methane, 25 parts by weight of monofluorotrichloro-methane and 25 parts by weight of a technical propane-butane-mixture into a liquid gas aerosol-spray can and sprayed upon the areas to be protected.

EXAMPLE 6

35 parts by weight of an alkylphenol-formaldehyde resin, 12 parts by weight of linseed oil stand oil, and 12 parts by weight of wood oil stand oil are homogeneously mixed at elevated temperature, optionally together with some lacquer or varnish benzene. Then 1.2 parts by weight of a siccative (a drying agent) and 11 parts by weight of N-diethyl-caprylamide are added and the entire mixture is brought, with varnish benzene, to a brushing or coating consistency whereby the finished coating substance may contain, for instance, 28.8 parts of the varnish benzene. The resulting clear varnish is applied to the respective surfaces, especially wood surfaces.

EXAMPLE 7

To a mixture containing 20 parts by weight of softener-free polyvinylacetate dispersion (50% in water), 6 parts by weight of softener-containing polyvinyl acetate dispersion and 2 parts by weight of water, there is added by stirring, a mixture of 4 parts by weight of N-diethyl-caprylamide and 2 parts by weight of ethanol; then a paste of 35 parts by weight of chalk, 5 parts by weight of titanium dioxide, 14 parts by weight of water and 2 parts by weight of 4% aqueous methylcellulose solution, and further diluted with 6 parts of water. 4 parts by weight of N-diethyl-caprylamide are stirred into this mixture. If desired, this brushing or coating substance can be further diluted with a little water. It dries dull and becomes resistant to wiping.

EXAMPLE 8

10.0 parts by weight of caprylic acid di-isopropylamide, 0.5 part by weight of collodium wool which has a high viscosity soluble ethyl acetate and ethanol-moist, and 0.5 part by weight of scent substance are mixed and diluted with 89.0 parts by weight of methylene-chloride. This solution is filled with 50 parts by weight of di-fluoro-dichloro-methane, 25 parts by weight of mono-fluoro-tri-chloro-methane, and 25 parts by weight of a technical propane-butane mixture in a liquid-gas-aerosol spray can and sprayed upon the surface to be protected.

EXAMPLE 9

34 parts by weight of an alkyl-phenol-formaldehyde resin, 12 parts by weight of linseed stand oil and 12 parts by weight of wood oil stand oil are homogeneously mixed at an elevated temperature, optionally with some lacquer benzine. Then 1.2 parts by weight of a siccative and 11 parts by weight of caprylic acid dimethyl-amide are mixed in and the entire mixture is brought to a brushing consistency with lacquer benzine, whereby the finished brushing material may contain for instance 28.8 parts of lacquer benzine. This clear lacquer is brushed upon surfaces, in particular wood surfaces.

EXAMPLE 10

A mixture of 4 parts by weight of caprylic acid dimethyl-amide and 2 parts by weight of ethanol are stirred into a mixture of 20 parts by weight of softener-free polyvinylacetate aqueous dispersion (50%). 6 parts by weight of a softener-containing polyvinylacetate dispersion and 2 parts by weight of water, then is worked into a paste of 35 parts by weight of chalk, 5 parts by weight of titanium dioxide, 14 parts by weight of water and 2 parts by weight of 4% aqueous solution of methylcellulose. The paste is then further diluted with 6 parts of water. 4 parts by weight of caprylic acid-mono-ethyl-amide are stirred into this mixture. This brushing material can be further diluted with a little water if desired. It dries dull and resistant to rubbing.

It will be understood that the foregoing description of the invention, and the examples set forth are merely illustrative of the principles thereof. Accordingly, the appended claims are to be construed as defining the invention within the full spirit and scope thereof.

We claim:

1. Repellents containing in addition to conventional vehicular materials a content of up to about 95 percent by weight of an N-substituted caprylic acid amide of the general formula

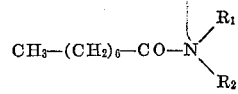

wherein $R_1$ designates a member of the group consisting of hydrogen and lower alkyl and $R_2$ is lower alkyl, the total number of carbon atoms of $R_1$ plus $R_2$ being from 2 to 6 carbon atoms.

2. A repellent in accordance with claim 1 wherein $R_1$ and $R_2$ are methyl.

3. A repellent in accordance with claim 1 wherein $R_1$ and $R_2$ are ethyl.

4. A repellent in accordance with claim 1 wherein $R_1$ and $R_2$ are isopropyl.

5. A repellent in accordance with claim 1 wherein $R_1$ is hydrogen and $R_2$ is ethyl.

6. A repellent in accordance with claim 1 wherein $R_1$ is hydrogen and $R_2$ is methyl.

7. A caprylic acid mono-ethyl amide having the formula $CH_3-(CH_2)_6-CO-NH-C_2H_5$ 8. Caprylic acid-di isopropryl-amide having the formula

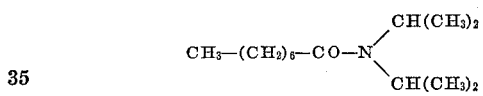

9. Repellents in accordance with claim 1 wherein the vehicular material is a cosmetic base.

10. Repellents in accordance with claim 1 wherein the vehicular material is liquid.

11. Repellents in accordance with claim 1 wherein the vehicular material is a surface coating composition.

12. Repellents in accordance with claim 11 wherein the surface coating composition is a varnish.

13. Repellents in accordance with claim 11 wherein the surface coating composition is a lacquer.

14. A method of imparting insect repellency to a surface which comprises applying to the surface a composition containing an N-substituted caprylic acid amide of the general formula

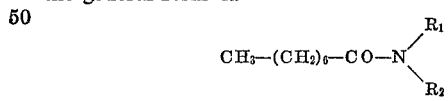

wherein $R_1$ designates a member of the group consisting of hydrogen and lower alkyl and $R_2$ is lower alkyl, the total number of carbon atoms of $R_1$ plus $R_2$ being from 2 to 6 carbon atoms.

References Cited in the file of this patent

UNITED STATES PATENTS

| | | |
|---|---|---|
| 1,871,949 | Bottrell | Aug. 16, 1932 |
| 1,925,225 | Arnold | Sept. 5, 1933 |
| 1,957,429 | Adams | May 8, 1934 |
| 2,077,479 | Hollander | Apr. 20, 1937 |
| 2,166,118 | Bousquet | July 18, 1939 |
| 2,166,119 | Bousquet | July 18, 1939 |
| 2,166,120 | Bousquet | July 18, 1939 |
| 2,197,624 | Horst | Apr. 16, 1940 |
| 2,587,957 | Bauer | Mar. 4, 1952 |

FOREIGN PATENTS

| | | |
|---|---|---|
| 503,490 | Great Britain | Apr. 4, 1939 |
| 179,916 | Austria | Oct. 25, 1954 |

(Other references on following page)

OTHER REFERENCES

Ind. and Eng. Chem., vol. 43, No. 7, July 1951, pp. 1158-1163.

Science News Letter, vol. 58, No. 23, Dec. 2, 1950, pg. 354.

Tappi: vol. 38, No. 6, June 1955, pp. 322-326.

McCabe: Jour. Org. Chem., vol. 19, No. 4, April 1954, pp. 493-498.

U.S.D.A. (1) Bulletin No. ARS-33-1, Sept. 1954, pp. 1-9.

U.S.D.A. (2) Bulletin No. ARS-33-31, Oct. 1956, pp. 1-10.

Chem. Abs. 32 492(6); 40 5698(4); 36 4475(1); 33 1274(9); 46 2487(b).

J.A.C.S., vol. 76, p. 3730, 1954.